(12) United States Patent
Miller et al.

(10) Patent No.: US 11,473,720 B2
(45) Date of Patent: Oct. 18, 2022

(54) HANGER ATTACHMENT FOR POSTS

(71) Applicant: Ex Nihilo, LLC, Lehi, UT (US)

(72) Inventors: Jared Miller, Lehi, UT (US); Chris Hess, Lehi, UT (US)

( * ) Notice: Subject to any disclaimer, the term of this patent is extended or adjusted under 35 U.S.C. 154(b) by 8 days.

(21) Appl. No.: 17/109,419

(22) Filed: Dec. 2, 2020

(65) Prior Publication Data

US 2021/0164609 A1    Jun. 3, 2021

Related U.S. Application Data

(60) Provisional application No. 62/942,610, filed on Dec. 2, 2019.

(51) Int. Cl.
| | |
|---|---|
| *F16M 13/02* | (2006.01) |
| *G09F 7/18* | (2006.01) |
| *F41J 1/10* | (2006.01) |

(52) U.S. Cl.
CPC .......... *F16M 13/02* (2013.01); *F16M 13/022* (2013.01); *F41J 1/10* (2013.01); *G09F 7/18* (2013.01); *G09F 2007/1804* (2013.01)

(58) Field of Classification Search
CPC .. F16M 13/022; F41J 1/10; G09F 2007/1804; G09F 2007/1813; G09F 2007/1817
See application file for complete search history.

(56) References Cited

U.S. PATENT DOCUMENTS

| | | | | |
|---|---|---|---|---|
| 3,327,415 A | * | 6/1967 | Pearson | G09F 7/18 40/666 |
| 4,412,396 A | * | 11/1983 | Silbernagel | E01F 9/688 40/611.12 |
| 4,631,783 A | * | 12/1986 | Hayashi | F16M 13/02 24/30.5 S |
| 6,209,837 B1 | * | 4/2001 | Harms | E04F 11/18 248/302 |
| 6,676,094 B1 | * | 1/2004 | Brown | F16M 13/022 248/539 |
| 7,341,229 B1 | * | 3/2008 | Flowers | B65H 49/325 248/301 |
| 8,622,394 B2 | * | 1/2014 | Larue | F41J 1/10 273/407 |
| 9,022,334 B1 | * | 5/2015 | DeMayo | A61G 13/101 248/229.24 |
| 9,353,890 B2 | * | 5/2016 | Dickinson | F16B 1/00 |
| 9,378,666 B1 | * | 6/2016 | Woodruff | F16M 13/022 |
| 9,400,081 B1 | * | 7/2016 | Chen | F16B 2/241 |
| 10,030,944 B1 | * | 7/2018 | Miller | F41J 1/01 |
| 10,487,979 B2 | * | 11/2019 | Simons | E04H 12/00 |
| 10,605,403 B2 | * | 3/2020 | Hawk | A47G 7/044 |
| 10,619,377 B2 | * | 4/2020 | Beisser, III | E04H 17/266 |
| 10,858,823 B2 | * | 12/2020 | Francis | E04B 1/40 |
| 2008/0093519 A1 | * | 4/2008 | Olson | A47G 29/1216 248/218.4 |
| 2010/0288897 A1 | * | 11/2010 | Chang | G09F 7/18 248/229.2 |
| 2016/0312478 A1 | * | 10/2016 | Klapperich | B65H 49/16 |

(Continued)

*Primary Examiner* — Bradley Duckworth
(74) *Attorney, Agent, or Firm* — Loyal IP Law, PLLC; Travis Banta

(57) ABSTRACT

A hanger is provided for use with a post. The hanger includes a body. The body of the hanger includes an aperture disposed in the body. A first retaining tab is disposed at a first end of the aperture while a second retaining tab is disposed at a second end of the aperture.

19 Claims, 3 Drawing Sheets

(56) References Cited

U.S. PATENT DOCUMENTS

| | | | |
|---|---|---|---|
| 2017/0089515 A1* | 3/2017 | Snyder | F16M 13/022 |
| 2017/0343324 A1* | 11/2017 | Fernandez | F41J 7/00 |
| 2019/0251874 A1* | 8/2019 | Patterson | F16M 13/02 |
| 2019/0383441 A1* | 12/2019 | Cummins | G09F 7/18 |
| 2021/0010617 A1* | 1/2021 | Vaccaro | F16L 3/1222 |
| 2021/0033373 A1* | 2/2021 | Babcock | F41J 1/10 |
| 2021/0079685 A1* | 3/2021 | Beisser, III | E04H 17/08 |

* cited by examiner

HANGER ATTACHMENT FOR POSTS

CROSS-REFERENCE TO RELATED APPLICATIONS

This application claims the benefit of U.S. Provisional Application No. 62/942,610, filed Dec. 2, 2019, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

Technical Field

This disclosure relates generally to hanger attachment for a post. For example, the hanger may include an aperture that fits a standard sized post and include a connector for attaching another element, such as a sign, a target, or other element.

Background

Posts are found in a variety of places and are used for a variety of purposes. For example, fence posts provide structure that supports slats in a fence. In buildings, posts support beams, or headers, that either span a distance over a non-weight bearing structure, such as a door or a window, or provide vertical support for a load bearing beam, installed to support a floor or roof above. Posts may also be used as structural support for overhanging, balconies, and other building features.

Posts come in a variety of sizes, for a variety of purposes, from a variety of materials. Fence posts, for example, may be installed in the ground and may be made of a metal or wood, depending on a type of fence. Signposts may be metal or wood, for aesthetic reasons or for durability. Structural posts may be made from metal, wood, or laminated veneer lumber, to suit different applications. In construction applications, posts are usually sized standardly to be commonly used in differing applications. For example, the most common post in construction applications is known as a "2×4," pronounced "two by four," which is available at virtually any construction goods store in the United States. So called "dimensional lumber" refers to lumber that is commonly referred to by size instead of by a name or, rather, that the size of the lumber has become a name for that lumber. For example, various sizes of dimensional lumber are known as "two by sixes," "two by eights," and so on. Only complicating matters more, the lumber industry has reduced the physical size of dimensional lumber to obtain more individual pieces of lumber from a single tree. For example, a "two by four," which, in the past referred to lumber that was two inches thick by four inches wide was cut exactly two inches thick and four inches wide. Today, the same "two by four" is 1.50 inches thick and 3.50 inches wide.

Dimensional lumber is often used as a signpost or used to convey a message. Wooden telephone and electric poles are frequently plastered with informational bills or messages conveying anything from political support for a particular candidate to a lost child or pet. On construction sites, signs are frequently made from dimensional lumber to warn visitors about hazards at the site, indicate a funding source for the construction, indicate the purpose of the construction, and a host of other information. Construction lumber is particularly suitable for this purpose, because dimensional lumber is well suited for building placards or holding signs and is relatively inexpensive on a per board basis.

Unfortunately, signs placed on posts typically require some construction to build a permanent enough support to maintain a sign in a particular position. And, the less building that goes into a sign holder, the less likely the structure is to withstand the elements for any significant period of time. Further, when a post is used to hold a sign operating as a target, for example, a single two by four is typically inadequate to hold the sign in position for a substantial length of time.

It is therefore one object of this disclosure provide a hanger which attaches to a post in a fixed position. It is another object of this disclosure to provide a hanger which attaches to a post in a fixed position and serves to hold a sign. It is another object of this disclosure to provide a hanger which attaches to a post in a fixed position and which includes a sign attachment. It is a further object of this disclosure to provide a hanger which attaches to a post in a fixed position and which includes a sign attachment that holds a target.

SUMMARY

A hanger is provided for use with a post. The hanger includes a body. The body of the hanger includes an aperture disposed in the body. A first retaining tab is disposed at a first end of the aperture while a second retaining tab is disposed at a second end of the aperture.

BRIEF DESCRIPTION OF DRAWINGS

The accompanying drawings illustrate several embodiments of a system and device for a hanger attachment for posts. The illustrated embodiments are exemplary and do not limit the scope of the disclosure.

DETAILED DESCRIPTION

In the following description, for purposes of explanation and not limitation, specific techniques and embodiments are set forth, such as particular techniques and configurations, in order to provide a thorough understanding of the system and device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein.

References may be made that include horizontal and or vertical planes. Planes should be understood using the Cartesian Coordinate System. A vertical plane should be understood to mean a plane that incorporates the Y and Z axis. Also, a horizontal plane should be understood to mean a plane incorporates the X and Z axis. Moreover, the word horizontal should be understood as a 90° angle plus or minus 10°.

Figure 1:
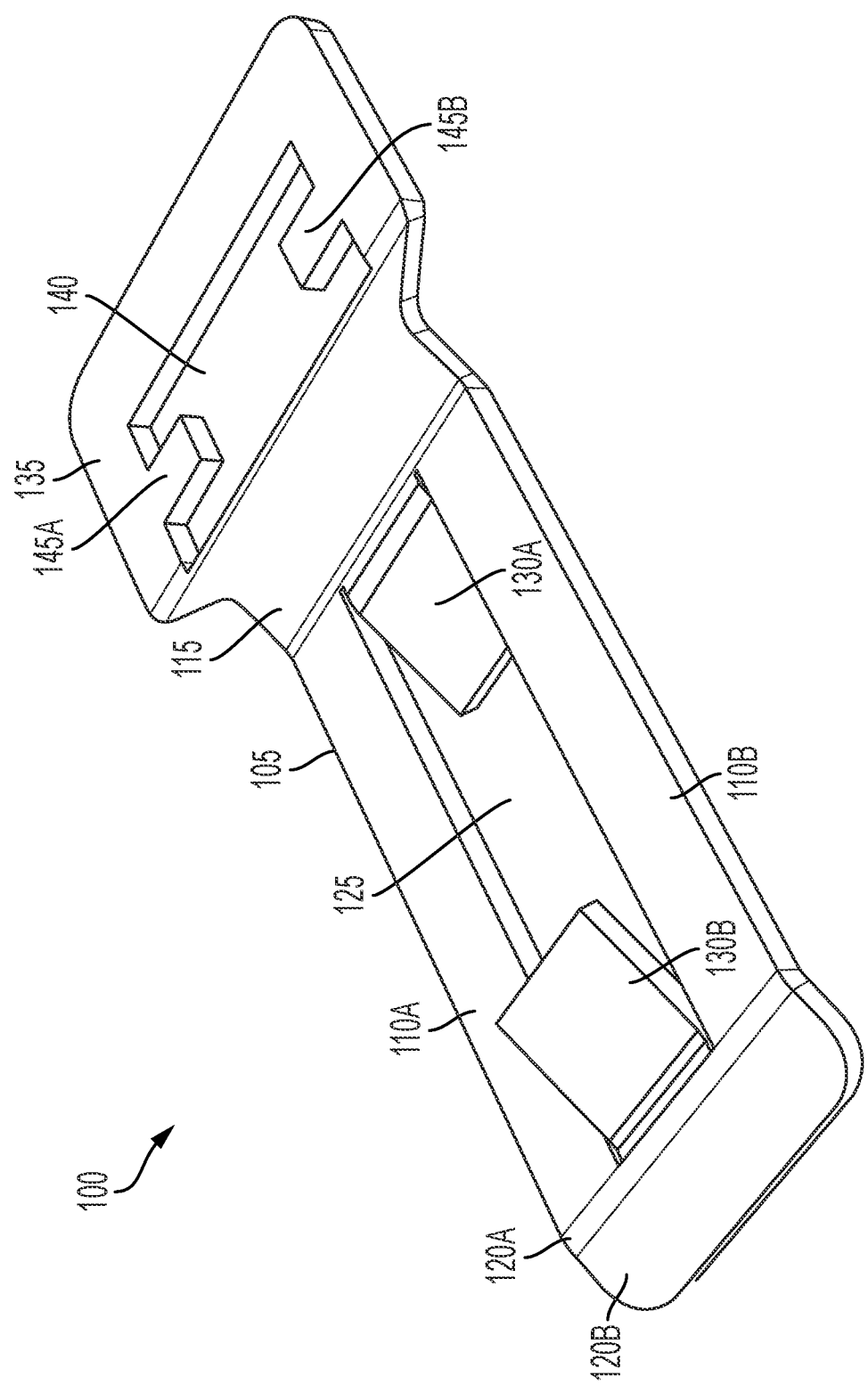
FIG. 1 illustrates a perspective view of an embodiment of a hanger attachment for posts.

FIG. 1 illustrates a perspective view of a hanger attachment 100 for use with posts. Hanger attachment may also be referred to as a "post hanger" and may be attached to a post, as will be discussed herein, to hold another item or element on the post in a secure manner. Hanger attachment 100 may be implemented with a body 105. Body 105 may be made from a variety of materials, including plastic, composites, wood, and metal. In a preferable embodiment, body 105 may be made from ballistically resilient steel, such as steel with a Brinell hardness number of between 500-550. Body 105 may be implemented as a single component or may be assembled having different pieces that are attached to each other by techniques known in the art, such as adhesives, sintering, brazing, welding, or other joinery techniques. In one embodiment, body 105 may be formed as a single piece from ballistically resilient steel using a plasma cutting torch.

Body 105 includes two supporting arms 110A and 110B which extend from connector transition 115 to release tab 120A, which will be discussed in more detail below. Connector transition 115 may be positioned on a first end of supporting arms 110A and 110B. Release tab 120A may be positioned at a second end of supporting arms 110A and 110B which is opposite the first end. Further, release tab 120A may include a portion 120B that is disposed at an angle relative to supporting arms 110A and 110B. For example, if supporting arms 110A and 110B are placed along an XY plane in a cartesian system, release tab 120A may be angled in a negative Z direction (e.g., angled downward) to facilitate release of tab 120A from a post, as will be discussed below.

Supporting arms 110A and 110B may surround an aperture 125 which is installed within body 105. Aperture 125 may also have a retaining tab 130A disposed at a first end of aperture 125 and a second retaining tab 130B disposed at a second end of aperture 125. Retaining tabs 130A and 130B may also be bent or disposed at an angle relative to supporting arms 110A and 110B. For example, as shown in FIG. 1, if supporting arms 110A and 110B are disposed in an XY plane, retaining tab 130A may be angled in a negative Z direction (e.g., angled downwards) while retaining tab 130B may be angled in a positive Z direction (e.g., angled upwards). In a preferable embodiment, retaining tabs 130A and 130B are angled oppositely of one another. In another embodiment, retaining tabs 130A and 130B are not angled. In another embodiment, retaining tabs 130A and 130B are both angled in the same direction, whether a positive Z direction or a negative Z direction.

Aperture 125 may be sized with retaining tabs 130A and 130B to accept dimensional lumber into aperture 125. For example, aperture 125 may be sized to accept a standard two by four or a standard two by six (which are respectively smaller than their names imply). For example, dimensional lumber, or another post, may be inserted through aperture 125. When the dimensional lumber is inserted through aperture 125 and hanger 100 is disposed at a desired position on the dimensional lumber, retaining tabs 130A and 130B may catch on the dimensional lumber and retain hanger 100 in position on a sign. If the dimensional lumber is buried in the ground, buried in cement, held by a stand, or otherwise positioned in an upright manner, hanger 100 may be positioned to hold another element in place without significant construction or effort. Retaining tabs 130A and 130B may be removed from the post by simply pushing on release tab 120A which causes retaining tabs 130A and 130B to remove themselves from the post or from contact with the post and allows hanger 100 to easily slide along the post.

As previously discussed, body 105 includes a connector transition 115 which connects structural arms 110A and 110B to connector 135. Connector transition 115 may be bent or disposed at an angle as a transition between structural arms 110A and 110B and connector 135. For example, if structural arms 110A and 110B are disposed in an XY plane, connector transition 115 may be angled in a positive Z direction (e.g., angled upwards) to connector 135. Connector 135 may be parallel to structural arms 110A and 110B.

Connector 135 is shown as one possible implementation for a connector 135, although any number of connectors may be installed as connector 135. For example, connector 135 includes an aperture 140 which is interrupted by two tabs 145A and 145B which are meant to retain an element or item that fits through a first part of aperture 140, passes through a second part of aperture 140 between tabs 145A/145B and rests on a top of a third part of aperture 140. Tabs 145A and 145B may make the second part of the aperture the narrowest part of aperture 140. The first part of the aperture may be wider than the second part of the aperture but less wide than the third part of the aperture, which may be the widest part of the aperture. Width, in this case means a distance between opposing sides of aperture 140 (e.g., where tabs 145A and 145B are on opposing sides of the aperture 140). However, other connectors which include a retainer, such as tabs 145A/145B to hold an item or element, such as a sign, a target, or another item. For example, in one embodiment, connector 135 may interface with a target and secure a target to a post by hanger 100 in a manner that holds the target securely in place on the post as it is impacted by projectiles fired from a firearm, gun, bow, or other device which fires projectiles. Further, hanger 100 is well suited for use as a target holder because aperture 125 may be sized for relatively cheap dimensional lumber which can hold and support a target without concern that the dimensional lumber will be ruined or destroyed by projectile impact.

Figure 2:
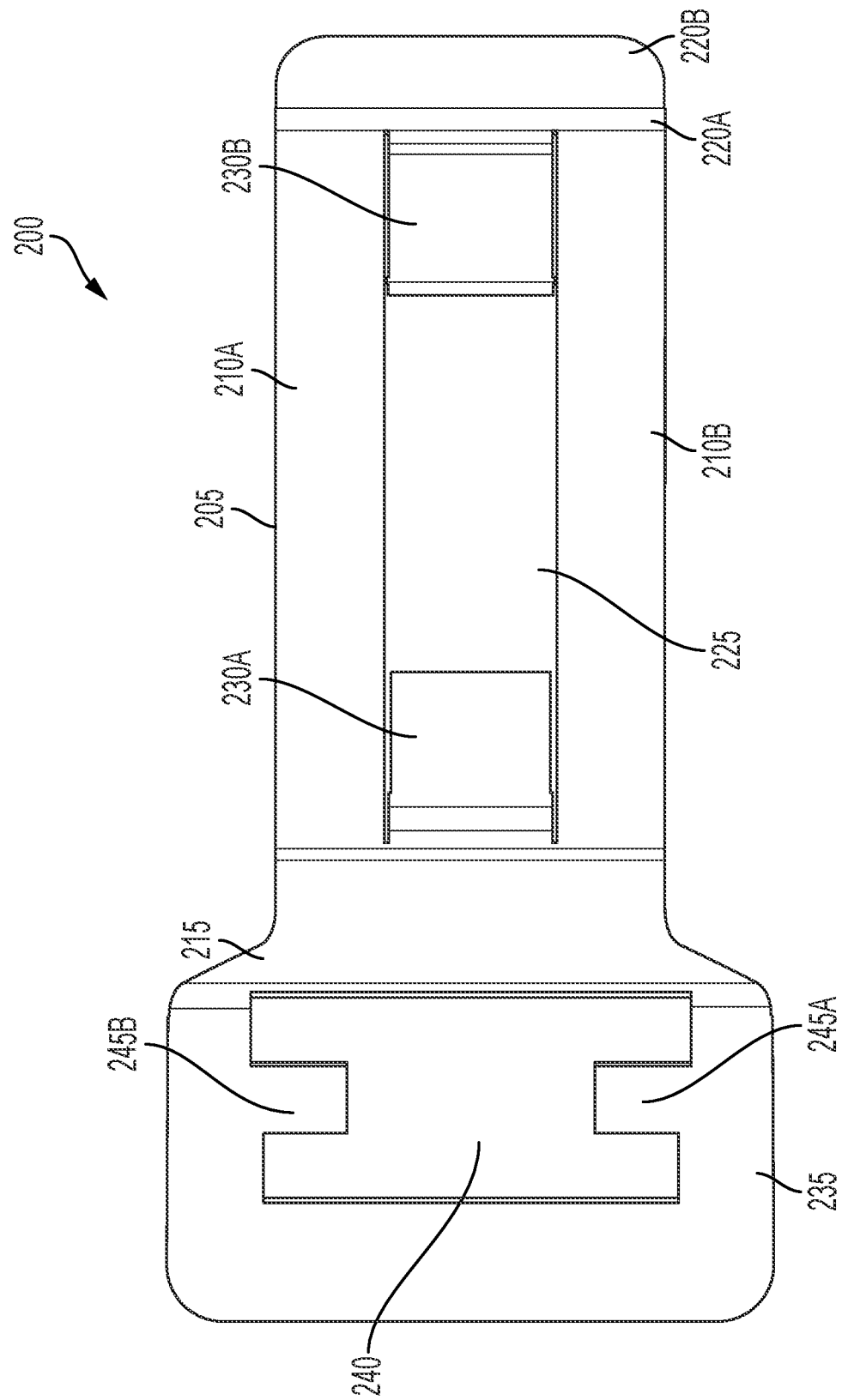
FIG. 2 illustrates a top view of an embodiment of a hanger attachment for posts.

FIG. 2 illustrates a top view of a hanger attachment 200 for use with posts. Hanger attachment may also be referred to as a "post hanger" and may be attached to a post, as will be discussed herein, to hold another item or element on the post in a secure manner. Hanger attachment 200 may be implemented with a body 205. Body 205 may be made from a variety of materials, including plastic, composites, wood, and metal. In a preferable embodiment, body 205 may be made from ballistically resilient steel, such as steel with a Brinell hardness number of between 500-550. Body 205 may be implemented as a single component or may be assembled having different pieces that are attached to each other by techniques known in the art, such as adhesives, sintering, brazing, welding, or other joinery techniques. In one embodiment, body 205 may be formed as a single piece from ballistically resilient steel using a plasma cutting torch.

Body 205 includes two supporting arms 210A and 210B which extend from connector transition 215 to release tab 220A, which will be discussed in more detail below. Connector transition 215 may be positioned on a first end of supporting arms 210A and 210B. Release tab 220A may be positioned at a second end of supporting arms 210A and 210B which is opposite the first end. Further, release tab 220A may include a portion 220B that is disposed at an angle relative to supporting arms 210A and 210B. For example, if supporting arms 210A and 210B are placed along an XY plane in a cartesian system, release tab 220A may be angled in a negative Z direction (e.g., angled downward) to facilitate release of tab 220A from a post, as will be discussed below.

Supporting arms 210A and 210B may surround an aperture 225 which is installed within body 205. Aperture 225 may also have a retaining tab 230A disposed at a first end of aperture 225 and a second retaining tab 230B disposed at a second end of aperture 225. Retaining tabs 230A and 230B may also be bent or disposed at an angle relative to supporting arms 210A and 210B. For example, as shown in FIG. 2, if supporting arms 210A and 210B are disposed in an XY plane, retaining tab 230A may be angled in a negative Z direction (e.g., angled downwards) while retaining tab 230B may be angled in a positive Z direction (e.g., angled upwards). In a preferable embodiment, retaining tabs 230A and 230B are angled oppositely of one another. In another embodiment, retaining tabs 230A and 230B are not angled. In another embodiment, retaining tabs 230A and 230B are both angled in the same direction, whether a positive Z direction or a negative Z direction.

Aperture 225 may be sized with retaining tabs 230A and 230B to accept dimensioned lumber into aperture 225. For example, aperture 225 may be sized to accept a standard two by four or a standard two by six (which are respectively smaller than their names imply). For example, dimensional lumber, or another post, may be inserted through aperture 225. When the dimensional lumber is inserted through aperture 225 and hanger 200 is disposed at a desired position on the dimensional lumber, retaining tabs 230A and 230B may catch on the dimensional lumber and retain hanger 200 in position on a sign. If the dimensional lumber is buried in the ground, buried in cement, held by a stand, or otherwise positioned in an upright manner, hanger 200 may be positioned to hold another element in place without significant construction or effort. Retaining tabs 230A and 230B may be removed from the post by simply pushing on release tab 220A which causes retaining tabs 230A and 230B to remove themselves from the post or from contact with the post and allows hanger 200 to easily slide along the post.

As previously discussed, body 205 includes a connector transition 215 which connects structural arms 210A and 210B to connector 235. Connector transition 215 may be bent or disposed at an angle as a transition between structural arms 210A and 210B and connector 235. For example, if structural arms 210A and 210B are disposed in an XY plane, connector transition 215 may be angled in a positive Z direction (e.g., angled upwards) to connector 235. Connector 235 may be parallel to structural arms 210A and 210B.

Connector 235 is shown as one possible implementation for a connector 235, although any number of connectors may be installed as connector 235. For example, connector 235 includes an aperture 240 which is interrupted by two tabs 245A and 245B which are meant to retain an element or item that fits through a first part of aperture 240, passes through a second part of aperture 240 between tabs 245A/245B and rests on a top of a third part of aperture 240. However, other connectors which include a retainer, such as tabs 245A/245B to hold an item or element, such as a sign, a target, or another item. For example, in one embodiment, connector 235 may interface with a target and secure a target to a post by hanger 200 in a manner that holds the target securely in place on the post as it is impacted by projectiles fired from a firearm, gun, bow, or other device which fires projectiles. Further, hanger 200 is well suited for use as a target holder because aperture 225 may be sized for relatively cheap dimensional lumber which can hold and support a target without concern that the dimensional lumber will be ruined or destroyed by projectile impact.

Figure 3:
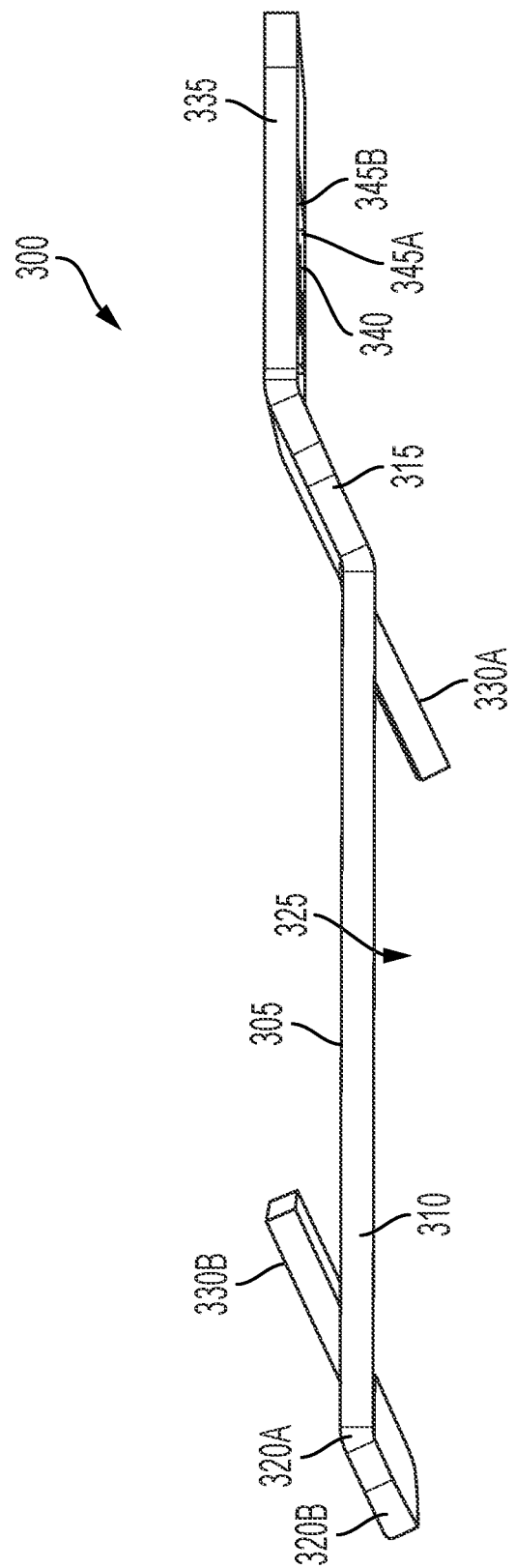
FIG. 3 illustrates a side view of an embodiment of a hanger attachment for posts.

FIG. 3 illustrates a side view of an embodiment of a hanger attachment 300 for posts. Hanger attachment may also be referred to as a "post hanger" and may be attached to a post, as will be discussed herein, to hold another item or element on the post in a secure manner. Hanger attachment 500 may be implemented with a body 305. Body 305 may be made from a variety of materials, including plastic, composites, wood, and metal. In a preferable embodiment, body 305 may be made from ballistically resilient steel, such as steel with a Brinell hardness number of between 500-550. Body 305 may be implemented as a single component or may be assembled having different pieces that are attached to each other by techniques known in the art, such as adhesives, sintering, brazing, welding, or other joinery techniques. In one embodiment, body 305 may be formed as a single piece from ballistically resilient steel using a plasma cutting torch.

Body 305 includes two supporting arms 310 which extend from connector transition 315 to release tab 320A, which will be discussed in more detail below. Connector transition 315 may be positioned on a first end of supporting arms 310. Release tab 320A may be positioned at a second end of supporting arms 310 which is opposite the first end. Further, release tab 320A may include a portion 320B that is disposed at an angle relative to supporting arms. For example, if supporting arms 310 are placed along an XY plane in a cartesian system, release tab 320A may be angled in a negative Z direction (e.g., angled downward) to facilitate release of tab 320A from a post, as will be discussed below.

Supporting arms 310 may surround an aperture 325 which is installed within body 305. Aperture 325 may also have a retaining tab 330A disposed at a first end of aperture 325 and a second retaining tab 330B disposed at a second end of aperture 325. As shown in FIG. 3, retaining tabs 330A and 330B may also be bent or disposed at an angle relative to supporting arms 310. For example, if supporting arms 310 are disposed in an XY plane, retaining tab 330A may be angled in a negative Z direction (e.g., angled downwards) while retaining tab 330B may be angled in a positive Z direction (e.g., angled upwards). In a preferable embodiment, retaining tabs 330A and 330B are angled oppositely of one another. In another embodiment, retaining tabs 330A and 330B are not angled. In another embodiment, retaining tabs 330A and 330B are both angled in the same direction, whether a positive Z direction or a negative Z direction.

Aperture 325 may be sized with retaining tabs 330A and 330B to accept dimensioned lumber into aperture 325. For example, aperture 325 may be sized to accept a standard two by four or a standard two by six (which are respectively smaller than their names imply). For example, dimensional lumber, or another post, may be inserted through aperture 325. When the dimensional lumber is inserted through aperture 325 and hanger 300 is disposed at a desired position on the dimensional lumber, retaining tabs 330A and 330B may catch on the dimensional lumber and retain hanger 300 in position on a sign. If the dimensional lumber is buried in the ground, buried in cement, held by a stand, or otherwise positioned in an upright manner, hanger 300 may be positioned to hold another element in place without significant construction or effort. Retaining tabs 330A and 330B may be removed from the post by simply pushing on release tab 320A which causes retaining tabs 330A and 330B to remove themselves from the post or from contact with the post and allows hanger 300 to easily slide along the post.

As previously discussed, body 305 includes a connector transition 315 which connects structural arms 310 to connector 335. Connector transition 315 may be bent or disposed at an angle as a transition between structural arms 310 and connector 335. For example, if structural arms 310 are disposed in an XY plane, connector transition 315 may be angled in a positive Z direction (e.g., angled upwards) to connector 335. Connector 335 may be parallel to structural arms 310.

Connector 335 is shown as one possible implementation for a connector 335, although any number of connectors may be installed as connector 335. For example, connector 335 includes an aperture 340 which is interrupted by two tabs 345A and 345B which are meant to retain an element or item that fits through a first part of aperture 340, passes through a second part of aperture 340 between tabs 345A/345B and rests on a top of a third part of aperture 240. However, other connectors which include a retainer, such as tabs 345A/345B to hold an item or element, such as a sign, a target, or another item. For example, in one embodiment, connector 335 may interface with a target and secure a target to a post by hanger 300 in a manner that holds the target securely in place on the post as it is impacted by projectiles fired from a firearm, gun, bow, or other device which fires projectiles. Further, hanger 300 is well suited for use as a target holder because aperture 325 may be sized for relatively cheap dimensional lumber which can hold and support a target without concern that the dimensional lumber will be ruined or destroyed by projectile impact.

The foregoing description is presented for purposes of illustration. It is not exhaustive and does not limit the invention to the precise forms or embodiments disclosed. Modifications and adaptations are apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A hanger, comprising:
    a body;
    an aperture disposed within the body;
    a first retaining tab disposed at a first end of the aperture and being disposed at an angle relative to the aperture, wherein the angle of the first retaining tab relative to the first end of the aperture is less than a perpendicular angle;
    a second retaining tab disposed at a second end of the aperture.

2. The hanger of claim 1, wherein the second retaining tab is disposed at an angle relative to the aperture.

3. The hanger of claim 1 wherein the first retaining tab and the second retaining tab are disposed at an angle relative to the aperture.

4. The hanger of claim 3, wherein the first retaining tab and the second retaining tab are disposed at an angle that is opposite to each other.

5. The hanger of claim 3, wherein the first retaining tab is angled in a positive Z direction relative to the aperture.

6. The hanger of claim 3, wherein the second retaining tab is angled in a negative Z direction relative to the aperture.

7. The hanger of claim 1, further comprising a connector having an aperture that includes a first part, a second part, and a third part.

8. The hanger of claim 7, wherein the second part includes tabs which narrow the aperture in the second part of the aperture to a narrowest part of the aperture and wherein the first part of the aperture is the widest part of the aperture.

9. The hanger of claim 8, wherein the third part of the aperture is wider than the second part of the aperture and less wide than the first part of the aperture.

10. The hanger of claim 7, further comprising a connector transition between the body and the connector.

11. The hanger of claim 10, wherein the connector transition between the body and the connector is disposed at an angle relative to the body and the connector.

12. The hanger of claim 1, wherein the body includes two supporting arms.

13. The hanger of claim 12, wherein the two supporting arms connect to a connector transition.

14. The hanger of claim 13, wherein the connector transition connects to a connector.

15. The hanger of claim 14, wherein the connector transition is disposed at an angle relative to the two supporting arms and the connector.

16. The hanger of claim 15, wherein the connector and the two supporting arms are disposed in parallel planes.

17. The hanger of claim 13, wherein the two supporting arms further connect to a release tab.

18. The hanger of claim 1, wherein the body further includes a release tab.

19. The hanger of claim 18, wherein the release tab is disposed at an angle relative to the body.

* * * * *